United States Patent
Daigle et al.

(10) Patent No.: US 12,540,207 B2
(45) Date of Patent: Feb. 3, 2026

(54) GLYCIDYL-CONTAINING POLYMERS, POLYMER COMPOSITIONS COMPRISING THEM AND THEIR USE IN ELECTROCHEMICAL CELLS

(71) Applicants: HYDRO-QUÉBEC, Montréal (CA); MURATA MANUFACTURING CO., LTD., Nagaokakyo (JP)

(72) Inventors: Jean-Christophe Daigle, St-Bruno-de-Montarville (CA); Yuichiro Asakawa, Tokyo (JP); Karim Zaghib, Longueuil (CA)

(73) Assignees: HYDRO-QUÉBEC, Montreal (CA); MURATA MANUFACTURING CO., LTD., Nagaokakyo (JP)

(*) Notice: Subject to any disclaimer, the term of this patent is extended or adjusted under 35 U.S.C. 154(b) by 1087 days.

(21) Appl. No.: 17/251,033

(22) PCT Filed: Jul. 5, 2019

(86) PCT No.: PCT/CA2019/050928
§ 371 (c)(1),
(2) Date: Dec. 10, 2020

(87) PCT Pub. No.: WO2020/006642
PCT Pub. Date: Jan. 9, 2020

(65) Prior Publication Data
US 2021/0189036 A1   Jun. 24, 2021

Related U.S. Application Data

(60) Provisional application No. 62/694,675, filed on Jul. 6, 2018.

(51) Int. Cl.
| | | |
|---|---|---|
| C08F 212/14 | (2006.01) | |
| C08F 4/08 | (2006.01) | |
| C08F 220/32 | (2006.01) | |
| H01M 50/121 | (2021.01) | |
| H01M 50/124 | (2021.01) | |
| H01M 4/02 | (2006.01) | |
| H01M 4/50 | (2010.01) | |
| H01M 4/58 | (2010.01) | |
| H01M 4/62 | (2006.01) | |
| H01M 50/103 | (2021.01) | |

(52) U.S. Cl.
CPC ............ *C08F 212/20* (2020.02); *C08F 4/08* (2013.01); *C08F 220/325* (2020.02); *H01M 50/121* (2021.01); *H01M 50/124* (2021.01); *H01M 2004/027* (2013.01); *H01M 2004/028* (2013.01); *H01M 4/50* (2013.01); *H01M 4/58* (2013.01); *H01M 4/623* (2013.01); *H01M 4/625* (2013.01); *H01M 50/103* (2021.01)

(58) Field of Classification Search
CPC ...... C08F 212/20; C08F 4/08; C08F 220/325; C08F 2800/10; C08F 8/00; C08F 8/48; C08F 230/08; H01M 50/121; H01M 50/124; H01M 4/50; H01M 4/58; H01M 4/623; H01M 4/625; H01M 50/103; H01M 2004/027; H01M 2004/028; H01M 50/109; H01M 10/0525; H01M 10/054; H01M 12/08; H01M 4/622; H01M 10/052; H01M 50/107; B01D 2253/202; B01D 2257/504; B01D 53/02; Y02C 20/40; C08K 5/3415; C08K 5/50; C08K 3/16; C08K 5/19; Y02E 60/10; Y02P 20/151; C08L 33/068
See application file for complete search history.

(56) References Cited

U.S. PATENT DOCUMENTS

| | | | |
|---|---|---|---|
| 10,700,345 B2 | 6/2020 | Oshawa et al. | |
| 2008/0008955 A1* | 1/2008 | Brodsky | G03F 7/091 430/270.1 |
| 2010/0036060 A1* | 2/2010 | Nakamura | H01G 9/028 525/383 |
| 2012/0187548 A1 | 7/2012 | Kugler | |
| 2013/0237660 A1 | 9/2013 | Iwasaki et al. | |
| 2013/0330591 A1 | 12/2013 | Saito et al. | |
| 2014/0217389 A1 | 8/2014 | Kugler et al. | |
| 2015/0037535 A1 | 2/2015 | Akimoto et al. | |
| 2016/0329567 A1 | 11/2016 | Lee et al. | |
| 2017/0088535 A1* | 3/2017 | Hou | C07D 317/12 |
| 2018/0248191 A1 | 8/2018 | Liu et al. | |

FOREIGN PATENT DOCUMENTS

| | | |
|---|---|---|
| CN | 01348611 A | 1/2009 |
| CN | 102482440 A | 5/2012 |
| CN | 103168057 A | 6/2013 |

(Continued)

OTHER PUBLICATIONS

Yamamoto (S.I. Yamamoto et al, Effective fixation of carbon dioxide into poly(glycidyl methacrylate) in the presence of pyrrolidone polymers, Journal of Polymer Science: Part A: Polymer Chemistry, vol. 43, 4578-4585 (2005)).*

Extended European Search Report dated Mar. 9, 2022, issued by the European Patent Office in corresponding European Application No. 19 831 393.4-1107, (12 pages).

Zhang Ying-Ying, et al, "Synthesis of an Amphiphilic Brush Copolymer by a Highly Efficient "Grafting onto" Approach via CO2 Chemistry", Macromolecular Rapid Communications, vol. 36, No. 9, Mar. 30, 2015, pp. 852-857.

Michalak, B. et al., "Gas Evolution in LiNi0.5Mn1.5O4/Graphite Cells Studied in Operando by a Combination of Differential Electrochemical Mass Spectrometry, Neutron Imaging, and Pressure Measurements" Analytical Chemistry 2016, vol. 88, No. 5, pp. 2877-2883.

(Continued)

*Primary Examiner* — Kumar R Bhushan
(74) *Attorney, Agent, or Firm* — Womble Bond Dickinson (US) LLP

(57) ABSTRACT

Glycidyl-containing polymers and polymer compositions comprising them are described, as well as their use in electrode materials and/or as coatings for battery components. Also described are electrode materials, electrodes, electrochemical cells and batteries comprising the polymers and their uses.

14 Claims, 7 Drawing Sheets

(56) References Cited

FOREIGN PATENT DOCUMENTS

| | | | |
|---|---|---|---|
| CN | 103282387 A | 9/2013 | |
| CN | 103454859 A | 12/2013 | |
| CN | 103620815 A | 3/2014 | |
| CN | 105131875 A | 12/2015 | |
| JP | 2004162019 A | 6/2004 | |
| JP | 2009277413 A | 11/2009 | |
| KR | 20150015321 | 2/2015 | |
| KR | 20150015394 | 2/2015 | |
| KR | 101 752 098 B1 | 6/2017 | |
| WO | 2011015808 A1 | 2/2011 | |
| WO | 2017/145874 A1 | 8/2017 | |

OTHER PUBLICATIONS

Mao, Z. et al.,"Calendar Aging and Gas Generation in Commercial Graphite/NMC-LMO Lithium-Ion Pouch Cell" Journal of the Electrochemical Society 2017, vol. 164, No. 14, pp. A3469-A3483.

North, M. et al.,"Mechanism of Cyclic Carbonate Synthesis from Epoxides and CO2" Angewandte Chemie International Edition 2009, vol. 48, No. 16, pp. 2946-2948.

Yamamoto, S. I. et al.,"Effective Fixation of Carbon Dioxide into Poly(glycidyl methacrylate) in the Presence of Pyrrolidone Polymers" Journal of Polymer Science Part A: Polymer Chemistry 2005, vol. 43, No. 19, pp. 4578-4585.

International Search Report (PCT/ISA/210) with translation and Written Opinion (PCT/ISA/237) mailed on Sep. 12, 2019, by the Canadian Patent Office as the International Searching Authority for International Application No. PCT/CA2019/050928.

Ganewatta, N., et al., "Monolithic capillary columns consisting of poly(glycidyl methacrylate-co-ethylene glycol dimethacrylate) and their diol derivatives with incorporated hydroxyl functionalized multiwalled carbon nanotubes for reversed-phase capillary electrochromatography", Analyst, 2018, vol. 143, pp. 270-279.

Gudipati, C. S., et al., "Synthesis of Poly(glycidyl methacrylate)-block-Poly(pentagluorostyrene) by RAFT: Precursor to Novel Amphiphilic Poly(glycidyl methacrylate)-block-Poly(pentafluorostyrene)", Macromolecular Rapid Communications, 2008, vol. 29, pp. 1902-1907.

Shim, J., et al., "Carboxylation of Styrene Oxide Catalyzed by Quaternary Onium Salts under Solvent-free Conditions", Bull. Korean Chem. Soc. 2006, vol. 27, No. 5, pp. 744-746.

Kim, J. W., et al., "Efficient Ring Opening Reaction of Epoxides with Oxygen Nucleophiles Catalysed by Quaternary Onium Salt", Bull. Korean Chem. Soc. 2013, vol. 34, No. 8, pp. 2286-2290.

Ko, J. M., et al., "Thin-film type Li-ion battery, using a polyethylene separator grafted with glycidyl methacrylate", Electrochimica Acta, 2004, vol. 50, pp. 367-370.

Pitois, C., et al., "Low-Loss Optical Waveguides Based on Photosensitive Poly(pentafluorostyrene-co-glycidyl methacrylate)", Macromolecules, 1999, vol. 32, pp. 2903-2909.

Office Action (Text of the First Office Action) issued on Apr. 19, 2022, by the China National Intellectual Property Administration in corresponding Chinese Patent Application No. 201980045250.8, and an English Translation of the Office Action. (34 pages).

Office Action for corresponding Korean Application No. 10-2021-7002971 mailed Aug. 1, 2024.

Examination Report for European application No. 19831393.4, dated Mar. 20, 2025.

\* cited by examiner

GLYCIDYL-CONTAINING POLYMERS, POLYMER COMPOSITIONS COMPRISING THEM AND THEIR USE IN ELECTROCHEMICAL CELLS

RELATED APPLICATION

This application claims priority under applicable laws to U.S. provisional application No. 62/694,675 filed on Jul. 6, 2018, the content of which is incorporated herein by reference in its entirety for all purposes.

TECHNICAL FIELD

The technical field generally relates to glycidyl-containing polymers, polymer compositions comprising them, their methods of production and their use in electrochemical cells.

BACKGROUND

Gas evolution during cycling is one of the major problems associated with high-performance batteries, and it is especially so in the case of batteries using manganese-based positive electrodes. Gas generation is caused by electrolyte decomposition occurring over the entire lifetime of the battery, but principally during the formation cycles. For instance, electrolyte decomposition and gas evolution primarily result from unwanted reactions of the electrolyte at the positive and/or the negative electrode interface, during cycling. For instance, electrolyte decomposition may be directly caused by the electrochemical decomposition of the electrolyte at the positive and/or the negative electrode interface or by additional degradation reactions. These reactions' rates generally increase with temperature, voltage and other stress factors such as over-charging and over-discharging. Gas evolution becomes a serious issue when implementing pouch-type cells, as these will swell and deform as gas is forming. The gas generated mainly consists of carbon dioxide ($CO_2$), carbon monoxide (CO), ethylene ($C_2H_4$), and hydrogen ($H_2$). For example, $CO_2$ and CO may be released as a result of carbonate electrolyte decomposition at the positive electrode (see Michalak, B. et al., *Analytical Chemistry* 2016, 88 (5), 2877-2883; and Mao, Z. et al., *Journal of The Electrochemical Society* 2017, 164 (14), A3469-A3483).

Accordingly, there is a need for a material which could capture $CO_2$ upon formation in the cell, for instance, a polymeric binder additive or a polymeric coating for an internal surface of a battery component.

SUMMARY

According to one aspect, the present technology relates to a polymer composition comprising a solvent, a catalyst and a polymer of Formula I:

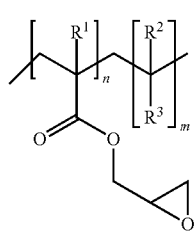

Formula I wherein:
$R^1$ and $R^2$ are each independently H or $CH_3$;
$R^3$ is selected from H, substituted or unsubstituted alkyl, substituted or unsubstituted aryl, substituted or unsubstituted $CO_2$alkyl; and n and m are integers, wherein n>0 and m is ≥0.

In one embodiment, $R^3$ is a substituted aryl, preferably a fluorine substituted aryl, for example, a perfluorinated aryl. In another example, $R^3$ is selected from H or a substituted or unsubstituted alkyl. In a further example, $R^3$ is a substituted or unsubstituted $CO_2$alkyl, for example, an unsubstituted $CO_2C_{1-4}$alkyl (e.g. $CO_2$methyl and $CO_2$butyl) or a $CO_2C_{1-4}$alkyl substituted with a group selected from alkoxy (e.g. $CO_2CH_2CH_2OCH_3$), trialkylsilyl, and trialkoxysilyl (e.g. $CO_2CH_2CH_2CH_2Si(OCH_3)_3$).

In another embodiment, the solvent is a solid solvent, for example, a polymer solvent. For example, the solid solvent is poly(N-vinylpyrrolidone) (PVP).

In another embodiment, the catalyst is a catalyst for $CO_2$ cycloaddition reaction. For example, catalyst is an inorganic catalyst (e.g. lithium bromide (LiBr)) or an organic catalyst. For instance, the catalyst is an organic catalyst, where such organic catalyst may include quaternary ammonium salts, phosphonium salts, imidazolium salts or any other known organic base catalysts for $CO_2$ cycloaddition, preferably a quaternary ammonium salt. In one example, the quaternary ammonium salt is a tetraalkylammonium halide (e.g. triethylbenzylammonium chloride ($Et_3BnNCl$)).

According to another aspect, the present technology relates to a battery or electrochemical cell shell comprising, on an internal surface, a layer of the polymer composition a defined herein.

In another embodiment, the shell is a pouch, a cylindrical, a prismatic or a button shaped shell. For example, the shell is a pouch.

According to another aspect, the present technology relates to a polymer of Formula I (a):

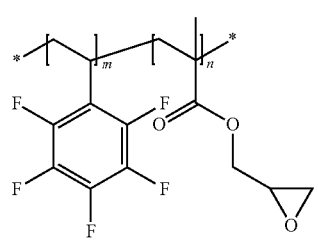

Formula I(a)

wherein n and m are integers, wherein n>0 and m is ≥0.

In another embodiment, the electrochemically active material is selected from the group consisting of metal oxide particles, lithiated metal oxide particles, metal phosphate particles and lithiated metal phosphate particles.

According to another aspect, an electrode material comprising a polymer of Formula I (a) and an electrochemically active material is described. In one embodiment, the electrode material further comprises a polymer binder, an electronically conductive material, or a combination thereof. For example, the polymer binder is present and is selected from the group consisting of fluorine containing polymers (e.g. PVdF, PTFE, etc.), water soluble binders (e.g. SBR, NBR, HNBR, CHR, and ACM), and ion-conductive polymer binders such as copolymers composed of at least one lithium-ion solvating segment (e.g. polyether segments) and at least one cross-linkable segment (e.g. PEO-based polymers comprising methyl methacrylate units). For instance, the polymer binder is PVdF.

In another embodiment, the polymer of Formula I (a) is a binder additive.

In one embodiment, the electronically conductive material is present and is selected from the group consisting of carbon black, acetylene black, graphite, graphene, carbon fibers, carbon nanofibers, carbon nanotubes, and combinations thereof.

In a further aspect, the present document further describes a positive electrode or a negative electrode comprising the electrode material on a current collector.

According to another aspect, the present technology relates to an electrochemical cell comprising a negative electrode, a positive electrode and an electrolyte, wherein the positive electrode is as defined herein, the negative electrode is as defined herein, or the positive electrode and the negative electrode are as defined herein.

According to a further aspect, the present technology relates to an electrochemical cell comprising a negative electrode, a positive electrode and an electrolyte, wherein the material of at least one of the positive electrode and negative electrode comprises an electrode material as herein defined.

According to another aspect, a battery comprising at least one electrochemical cell as defined herein is described.

According to another aspect, the present document also describes a battery comprising a polymer composition as defined herein. In one embodiment, the battery comprises at least one electrochemical cell and a polymer composition, both as defined herein. In one embodiment, the polymer composition forms a coating on a surface of a battery component. For example, said battery coating is on a surface of a current collector, on a thin film inert insertion, or an internal surface of a battery or electrochemical cell shell (e.g. solid casing or flexible pouch).

In one embodiment, the battery is selected from a lithium battery, a lithium-air battery, a lithium-sulfur battery, a lithium-ion battery, a sodium battery, and a magnesium battery.

According to a yet a further aspect, the present technology relates to a method for trapping $CO_2$ generated in a battery or electrochemical cell, comprising contacting said $CO_2$ with a polymer of Formula I:

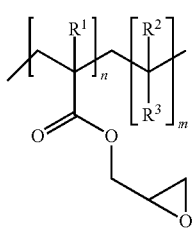

Formula I wherein:
$R^1$ and $R^2$ are each independently H or $CH_3$;
$R^3$ is selected from H, substituted or unsubstituted alkyl, substituted or unsubstituted aryl, substituted or unsubstituted $CO_2$alkyl; and
n and m are integers, wherein n>0 and m is ≥0.

In one embodiment, $R^3$ is a substituted aryl, preferably a fluorine substituted aryl, e.g. a perfluorinated aryl. In another example, $R^3$ is selected from H or a substituted or unsubstituted alkyl. In a further example, $R^3$ is a substituted or unsubstituted $CO_2$alkyl, e.g. an unsubstituted $CO_2C_{1-4}$alkyl (e.g. $CO_2$methyl and $CO_2$butyl) or a $CO_2C_{1-4}$alkyl substituted with a group selected from alkoxy (e.g. $CO_2CH_2CH_2OCH_3$), trialkylsilyl, and trialkoxysilyl (e.g. $CO_2CH_2CH_2CH_2Si(OCH_3)_3$).

In one embodiment, the method as described herein further comprises the step of applying a composition comprising the polymer on a surface of a battery or electrochemical cell component, wherein said composition further comprises a solvent and a catalyst.

In another embodiment, the solvent is a solid solvent, e.g. a polymer solvent. For example, the solid solvent is poly (N-vinylpyrrolidone) (PVP).

In another embodiment, the catalyst is a catalyst for the $CO_2$ cycloaddition reaction. For example, catalyst is an inorganic catalyst (e.g. lithium bromide (LiBr)) or an organic catalyst. For instance, the catalyst is an organic catalyst. For example, the organic catalysts include quaternary ammonium salts, phosphonium salts, imidazolium salts or any other known organic base catalysts for $CO_2$ cycloaddition, preferably quaternary ammonium salts. In one example, the quaternary ammonium salt is a tetraalkylammonium halide (e.g. triethylbenzylammonium chloride ($Et_3BnNCl$)).

In another embodiment, the battery or electrochemical cell is selected from a current collector, a thin film inert insertion, and an internal surface of a battery or electrochemical cell shell (e.g. solid casing or flexible pouch).

DETAILED DESCRIPTION

Figure 1:
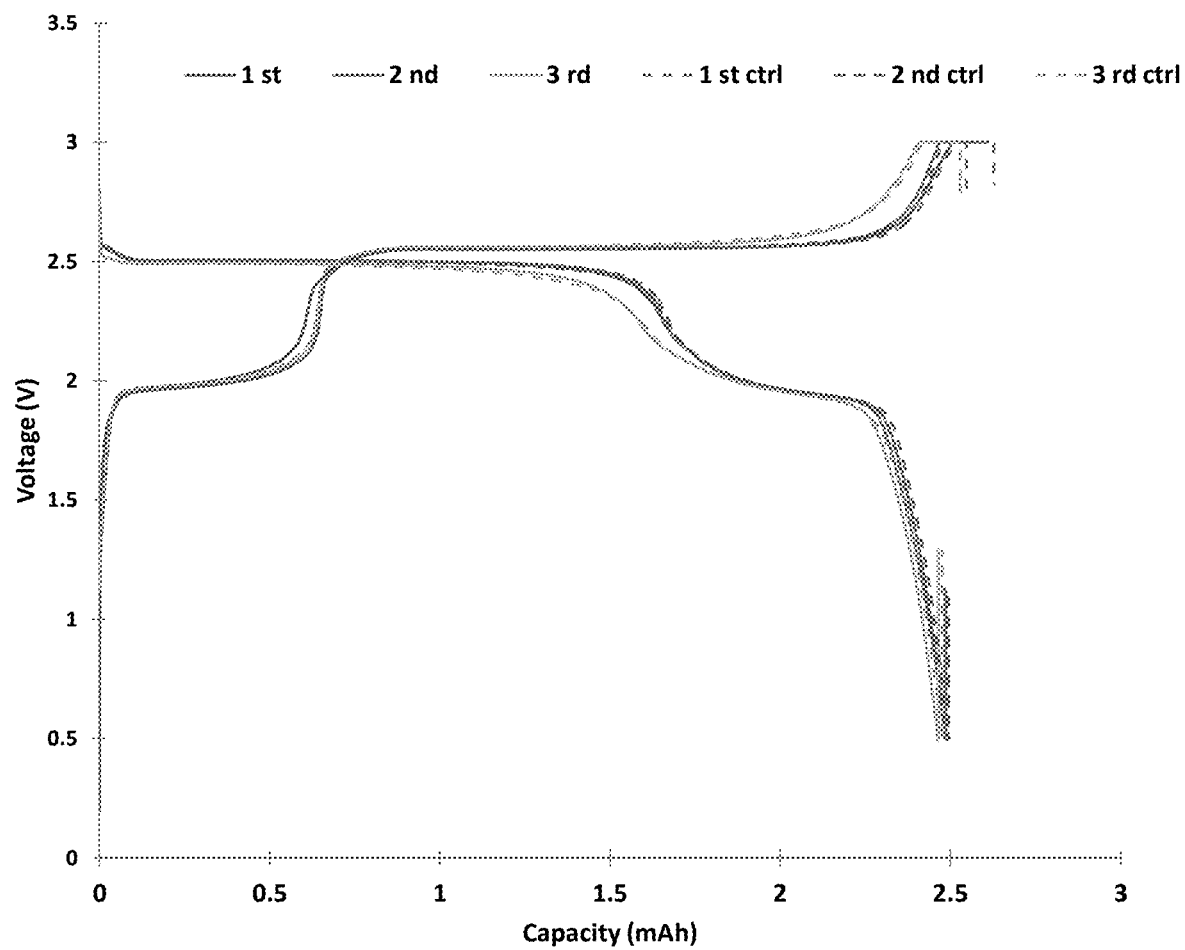
FIG. 1 displays three charge and discharge cycles preformed at 0.2 C at a temperature of 25° C. for Cell 1 (solid lines) and Cell 2 (dotted lines) as described in Example 1 (b).

The following detailed description and examples are illustrative and should not be interpreted as further limiting the scope of the invention.

All technical and scientific terms and expressions used herein have the same definitions as those commonly understood by the person skilled in the art related to the present technology. The definition of some terms and expressions used herein is nevertheless provided below for clarity purposes.

When the term "approximately" or its equivalent term "about" are used herein, it means approximately or in the region of, and around. When the terms "approximately" or "about" are used in relation to a numerical value, it modifies it; for example, it could mean above and below its nominal value by a variation of 10%. This term may also take into account rounding of a number as well as the probability of random errors in experimental measurements.

For more clarity, the expression "monomeric units derived from" and equivalent expressions as used herein will refer to polymer repeat units, which result from a polymerizable monomer after its polymerization.

The chemical structures described herein are drawn according to conventional standards. Also, when an atom, such as a carbon atom as drawn, seems to include an incomplete valency, then the valency is assumed to be satisfied by one or more hydrogen atoms even if they are not necessarily explicitly drawn.

The term "alkyl" as used herein refers to saturated hydrocarbons having from one to twelve carbon atoms, including linear or branched alkyl groups. Examples of alkyl groups include, without limitation, methyl, ethyl, propyl, butyl, pentyl, hexyl, isopropyl, tert-butyl, sec-butyl, isobutyl, and the like. When the alkyl group is located between two functional groups, then the term "alkyl" also encompasses alkylene groups such as methylene, ethylene, propylene, and the like.

The term "aryl" as used herein refers to functional group including rings having an aromatic character containing 6 to 14 ring atoms, preferably from 6 ring atoms. The term "aryl" applies to both conjugated monocyclic and polycyclic system. The term "aryl" also applies to both unsubstituted aryl groups and substituted aryl groups such as alkyl-substituted aryl, a partially fluorinated aryl, a fluoralkyl-substituted aryl. The aryl functional group may be directly attached, or connected via a $C_1$-$C_3$alkyl group (also referred to as arylalkyl or aralkyl). Examples of aryl groups include, without limitation, phenyl, benzyl, phenethyl, 1-phenylethyl, tolyl, naphthyl, biphenyl, terphenyl, indenyl, benzocyclooctenyl, benzocycloheptenyl, azulenyl, acenaphthylenyl, fluorenyl, phenanthrenyl, anthracenyl, and the like.

The term "alkoxy" as used herein refers to an alkyl group having an oxygen atom attached thereto. Representative alkoxy groups include groups having 1 to about 12 carbon atoms. Examples of alkoxy groups include methoxy, ethoxy, isopropyloxy, propoxy, isopropoxy, butoxy, iso-butoxy, tert-butoxy, pentoxy groups and the like.

The term "substituted", when in association with any of the foregoing groups refers to a group substituted at one or more position with appropriate substituents. Examples of substituents include, without limitation, fluorine atom, trifluoromethyl, lower alkyl, cycloalkyl, heterocycloalkyl, aryl, heteroaryl, lower alkoxy, aryloxy, benzyloxy, benzyl, alkoxycarbonyl, sulfonyls, silyls, silanes, siloxanes, oxo, and the like. Any of the above substituents can be further substituted if permissible, e.g. if the group contains an alkyl group, an alkoxy group, an aryl group, or other.

The present technology relates to new materials for capturing carbon dioxide ($CO_2$). For example, these materials are polymers comprising $CO_2$-trapping moieties (see North, M. et al., *Angewandte Chemie International Edition* 2009, 48 (16), 2946-2948; and Yamamoto, S. I. et al., *Journal of Polymer Science Part A: Polymer Chemistry* 2005, 43 (19), 4578-4585).

The present technology thus proposes polymers comprising moieties which can be used to capture $CO_2$. For example, these polymers may be homopolymers or copolymers, including random, alternate or block copolymers, and may comprise monomeric units containing moieties which can be used to trap $CO_2$, such as epoxide-containing functional groups. For instance, the polymer may capture $CO_2$ by catalytic conversion of $CO_2$ and epoxide groups into cyclic carbonates.

The present technology relates to polymers (homopolymers or copolymers) comprising monomeric units derived from glycidyl acrylate. For example, such polymers are intended for use in electrochemical cells. For instance, such polymers may be use to minimize gas evolution in pouch-type cells which is critical to their successful application.

For example, these polymers are contemplated for use as binder additives or as polymeric coatings on an internal component of an electrochemical cell.

According to a first aspect, the present technology relates to a polymer composition comprising a solvent, a catalyst and a polymer of Formula I:

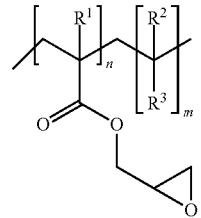

Formula I wherein:
$R^1$ and $R^2$ are each independently H or $CH_3$;
$R^3$ is selected from H, substituted or unsubstituted alkyl, substituted or unsubstituted aryl, substituted or unsubstituted $CO_2$alkyl; and
n and m are integers representing the number of each monomeric units within the polymer, wherein n >0 and m is ≥0.

In one example, $R^3$ is a substituted aryl, preferably a fluorine substituted aryl, e.g. a perfluorinated aryl. In another example, $R^3$ is selected from H or a substituted or unsubstituted alkyl. In a further example, $R^3$ is a substituted or unsubstituted $CO_2$alkyl, e.g. an unsubstituted $CO_2C_{1-4}$alkyl (e.g. $CO_2$methyl and $CO_2$butyl) or a $CO_2C_{1-4}$alkyl substituted with a group selected from alkoxy (e.g. $CO_2CH_2CH_2OCH_3$), trialkylsilyl, and trialkoxysilyl (e.g. $CO_2CH_2CH_2CH_2Si(OCH_3)_3$).

It is understood that the chain ends are drawn as being broken bonds and are not to be construed as representing or being limited to methyl groups. The polymer chains ends may be hydrogen atoms, alkyl groups, residues of polymerization initiator, etc. These chain ends have thus not been included in the polymer of Formula I (and I(a)) as defined herein.

In one example, the catalyst is a catalyst for the $CO_2$ cycloaddition reaction. For example, the catalyst is an inorganic catalyst (e.g. lithium bromide (LiBr)) or an organic catalyst. For instance, the catalyst is an organic catalyst. Non-limiting examples of organic catalysts include quaternary ammonium salts, phosphonium salts, imidazolium salts or any other known organic base catalysts for $CO_2$ cycloaddition, preferably quaternary ammonium salts. In one example, the quaternary ammonium salt is a tetraalkylammonium halide (e.g. triethylbenzylammonium chloride ($Et_3BnNCl$)).

In one example, the solvent is a solid solvent. For example, the solid solvent is selected for its ability to solubilize the catalyst for the $CO_2$ trapping reaction and for its low reactivity towards the epoxy functional groups. For instance, the solid solvent is a polar aprotic solid solvent, such as poly(N-vinylpyrrolidone) (PVP).

For instance, the polymer of Formula I is either a homopolymer or a copolymer prepared from the reaction of monomers comprising monomeric units derived from a glycidyl acrylate of Formula II:

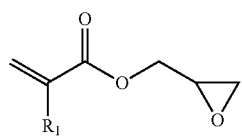

Formula II wherein $R^1$ is as herein defined.

In one example, $R^1$ is a methyl group and the glycidyl acrylate of Formula II is glycidyl methacrylate (GMA).

In one aspect, the polymer is a copolymer prepared by reacting a monomeric unit of Formula II and a second monomeric unit of Formula III:

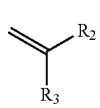

Formula III wherein $R^2$ and $R^3$ are as herein defined.

Non-limiting examples of the second monomeric unit of Formula III include acrylate-containing monomers and vinyl-containing monomers.

In one example, the vinyl containing monomer is pentafluorostyrene or ethylene. For example, the acrylate-containing monomer is selected from methyl acrylate, butyl acrylate, ethylene glycol methyl ether acrylate and 3-(trimethoxysilyl) propyl acrylate. For example, the second monomeric unit of Formula III is pentafluorostyrene, 3-(trimethoxysilyl) propyl acrylate or methyl acrylate.

Examples of second monomeric units of Formula III comprise the compounds of Formulae III (a), III (b), III (c), III (d), III (e) or III (f):

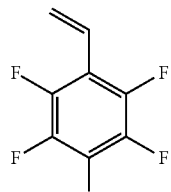

Formula III(a)

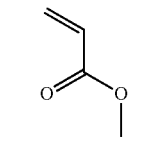

Formula III(b)

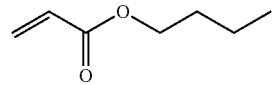

Formula III(c)

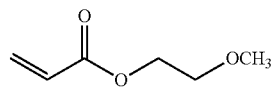

Formula III(d)

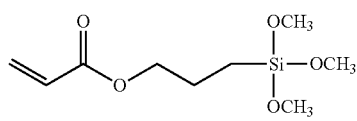

Formula III(e)

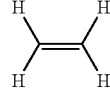

Formula III(f)

According to another aspect, the present technology relates to processes for producing the polymer as herein defined. The polymerization of the monomers may be accomplished by any known procedures. For instance, the polymerization is carried out by free radical polymerization (FRP). Where the polymer is a copolymer, the polymerization occurs between the monomeric units derived from Formula II and monomeric units of Formula III, for example by a polymerization process as illustrated in Scheme 1:

Scheme 1

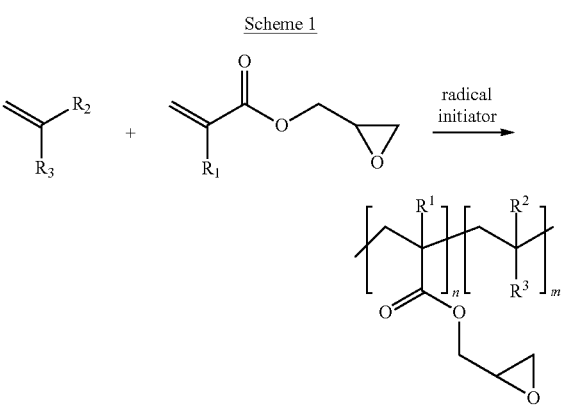

wherein $R^1$, $R^2R^3$, n and m are as herein defined.

For example, the radical initiator in Scheme 1 may be an azo compound, such as azobisisobutyronitrile (AIBN).

According to another example, the fee-radical polymerization of monomeric units derived from glycidyl acrylate of Formula II and vinyl-containing monomeric units of Formula III may be carried out in the presence of an aprotic solvent. For instance, the aprotic solvent may be dioxane. Alternatively, the fee-radical polymerization of monomeric units derived from glycidyl acrylate of Formula II and acrylate-containing monomeric units of Formula III may be carried out in the presence of a polar aprotic solvent. For instance, the polar aprotic solvent is tetrahydrofuran (THF).

According to another aspect, the present technology relates to a polymer composition as described herein for use in an electrochemical cell. Alternatively, the polymer composition as described herein is for use in the treatment of an internal surface of a battery component e.g. by coating said surface with the polymer composition.

In one example, the polymer composition forms a coating on a surface of at least one battery or electrochemical cell component. For instance, said battery coating is on a surface of a current collector, on a thin film inert insertion, or an internal surface of a battery or electrochemical cell shell (e.g. solid casing or flexible pouch). For example, the battery or electrochemical cell shell is a pouch-type shell but may also be any other known types of shells. For example, the thin film inert insertion is an aluminum thin film, a copper thin film or a polymer (e.g. polypropylene) thin film inserted in the battery or electrochemical cell shell. In one example, the battery or electrochemical cell component is an aluminum thin film inserted in the battery or electrochemical cell shell, the thin film adding non-significant weight to the battery or electrochemical cell.

In one example, when the polymer composition is for use in the treatment of an internal surface of a battery component, the second monomeric units of Formula III is selected for its chemical compatibility with the solid solvent, its low solubility in the electrolyte and its flexibility. In one example, the solid solvent is PVP and the second monomeric units of Formula III is an acrylate-containing monomer.

The second monomeric unit of Formula III may also be selected to improve adhesion between the polymer and the internal surface of the battery or electrochemical cell component to be treated. For example, ethylene may be use as the second monomeric unit of Formula III for the treatment of the internal polymer layer of an aluminum laminated film pouch shell. Alternatively, methyl acrylate, butyl acrylate, ethylene glycol methyl ether acrylate and 3-(trimethoxysilyl) propyl acrylate may be use as the second monomeric unit of Formula III for the treatment of aluminum thin films inserted in the battery or electrochemical shell.

For instance, when using 3-(trimethoxysilyl) propyl acrylate as the second monomeric unit of Formula III, the coating of the polymer as herein described on an aluminum thin film insertion may involve a process as illustrated in Scheme 2:

Scheme 2

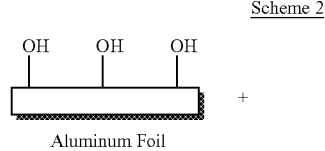

Aluminum Foil

+

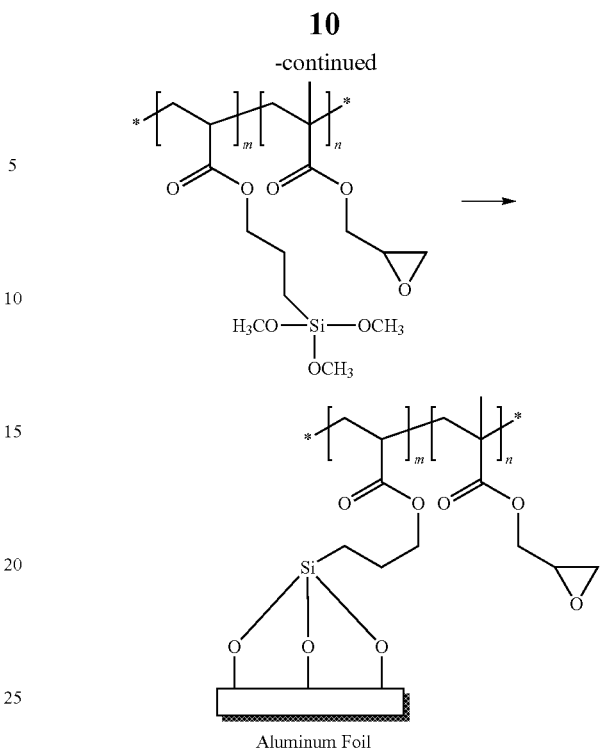

Aluminum Foil

According to another aspect, the present technology relates to a battery or electrochemical cell shell comprising, on an internal surface, a layer of the polymer composition as defined herein. For example, the shell is a pouch, a cylindrical, a prismatic, a coin or a button shaped shell. In one variant, the shell is a pouch-type shell.

For instance, the pouch-type shell is an aluminum laminated film made of a multilayer material. A layer of the polymer composition as defined herein is coated on the internal surface of said multilayer material. For instance, the multilayer material may comprise from outside to inside, an external polymer layer (e.g. a polyamide), an adhesive layer (e.g. a polyester-polyurethane), an aluminium foil, an adhesive layer (e.g. a urethane-free adhesive), an internal polymer layer (e.g. polypropylene and/or polyethylene) and a layer of the polymer composition as defined herein. For example, the second monomeric unit of Formula III is selected for its flexibility, for its ability to minimize solubility in the electrolyte, for its compatibility with the solvent and/or for its ability to adhere to the internal polymer layer. For example, the internal polymer layer is a polyethylene layer and the polymer of Formula I is a poly(ethylene-co-glycidyl methacrylate).

According to another aspect, the present technology relates to a polymer of Formula I (a):

Formula I(a)

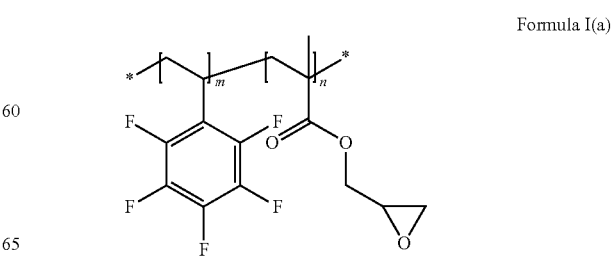

wherein:

n and m are integers, wherein n>0 and m is ≥0.

According to another aspect, the present technology relates to an electrode material comprising a polymer of Formula I (a) as defined herein and an electrochemically active material.

In one example, the electrochemically active electrode material comprises an oxide of a transition metal, for instance, selected from the group consisting of titanium (Ti), iron (Fe), manganese (Mn), vanadium (V), nickel (Ni), cobalt (Co), and the like, or a combination thereof when applicable. Non-limitative examples of electrochemically active materials include titanates and lithium titanates (e.g. $TiO_2$, $Li_2TiO_3$, $Li_4Ti_5O_{12}$, $H_2Ti_5O_{11}$, $H_2Ti_4O_9$, or a combination thereof), lithium metal phosphates and metal phosphates (e.g. $LiM'PO_4$ and $M'PO_4$ where M' is Fe, Ni, Mn, Co, or a combination thereof), vanadium oxides (e.g. $LiV_3O_8$, $V_2O_5$, $LiV_2O_5$, and the like), and other lithium and metal oxides such as $LiMn_2O_4$, $LiM''O_2$ (M'' being Mn, Co, Ni, or a combination thereof), and $Li(NiM''')O_2$ (M''' being Mn, Co, Al, Fe, Cr, Ti, Zr, and the like, or a combination thereof), or a combination of any of the above materials when compatible.

In one variant of interest, the electrode material is a positive electrode material. For instance, the positive electrode material is a manganese-containing oxide or phosphate such as those described above, for instance, a lithium manganese oxide, wherein Mn may be partially substituted by a second transition metal, such as lithium nickel manganese cobalt oxide (NMC). Alternatively, in one variant of interest the active material is a manganese-containing lithium metal phosphate such as those described above, for instance, manganese-containing lithium metal phosphate is lithium manganese iron phosphate ($LiMn_{1-x}Fe_xPO_4$, wherein x is between 0.2 and 0.5).

In one example, the electrochemically active electrode material further comprises at least one doping element to optimize its electrochemical properties. For example, the electrochemically active electrode material may be slightly doped with transition-metal (e.g. Fe, Co, Ni, Mn, Zn and Y) and/or non-transition-metal (e.g. Mg and Al) elements. For example, the electrochemically active electrode material is magnesium-doped.

The electrochemically active material may be in the form of particles which can be freshly formed or of commercial source, such as microparticles or nanoparticles, and optionally further include a coating such as a carbon coating.

In one example, the electrode material as described herein further comprises a polymer binder, an electronically conductive material, or a combination thereof. The electrode material may also optionally include additional components or additives like salts, inorganic particles, glass or ceramic particles, and the like.

Non-limiting examples of electronically conductive material include carbon black (e.g. Ketjen™ black), acetylene black (e.g. Shawinigan black and Denka™ black), graphite, graphene, carbon fibers (e.g. vapor grown carbon fibers (VGCF)), carbon nanofibers, carbon nanotubes (NTC), and combinations thereof. For example, the electronically conductive material is acetylene black or a combination of acetylene black and VGCF.

In one example, the electrode material comprises a polymer binder. The polymer binder is selected for its low reactivity towards the epoxy functional groups. Non-limiting examples of polymer binders include fluorine containing polymers (e.g. PVdF, PTFE, etc.), water-soluble binders (e.g. SBR, NBR, HNBR, CHR, and ACM, and combinations), and ion-conductive polymer binders such as copolymers composed of at least one lithium-ion solvating segment, such as a polyether, and at least one cross-linkable segment (e.g. PEO-based polymers comprising methyl methacrylate units). For example, the polymer binder is polyvinylidene fluoride (PVdF).

For instance, the polymer of Formula I (a) as described herein may be used as binder additive. The monomeric unit derived from pentafluorostyrene (PFS) is selected for its chemical compatibility with the polymer binder (PVdF), its insolubility in the electrolyte and for its electrochemical stability.

According to another aspect, the present technology relates to a positive electrode or a negative electrode comprising the electrode material as herein defined on a current collector.

According to another aspect, the present technology also relates to electrochemical cells comprising the present polymer or the present polymer composition. Such electrochemical cells comprise a negative electrode, a positive electrode and an electrolyte. In one example, the positive electrode, the negative electrode, or both the positive electrode and negative electrode comprise an electrode material as herein defined. The presence of said polymer or polymer composition does not negatively affect the electrochemical performances of the electrochemical cell.

For more clarity, the electrochemically active material of the negative electrode may be selected from any known material, including the electrochemically active material (selected for redox compatibility with the electrode active material) defined above, as well as alkali metal films; for example, metallic lithium film or an alloy thereof. In one example, the negative electrode material does not include the present polymer; but rather, it consists of a film of metallic material or a negative electrode material on a current collector. For example, the negative electrode material is lithium metal or a lithium insertion material. For instance, the negative electrode material comprises an electrochemically active material as defined herein, e.g. a lithium titanate.

According to another aspect, the present technology also relates to a battery comprising at least one electrochemical cell as defined herein. According to an alternative, the battery comprises a polymer composition as herein defined. Alternatively, the battery comprises at least one electrochemical cell as defined herein and the polymer composition as defined herein.

In one example, the polymer composition forms a coating on a surface of at least one battery or electrochemical cell component. For instance, said battery coating is on a surface of a current collector, on a thin film inert insertion, or an internal surface of a battery or electrochemical cell shell (e.g. solid casing or flexible pouch). For example, the thin film inert insertion is an aluminum thin film, a copper thin film or a polymer (e.g. polypropylene) thin film inserted in the battery or electrochemical cell shell. In one example, the battery or electrochemical cell component is an aluminum thin film inserted in the battery or electrochemical cell shell said thin film adding non-significant weight to the battery or electrochemical cell.

For example, the battery is selected from the group consisting of a lithium battery, a lithium-air battery, a lithium-sulfur battery, a lithium-ion battery, a sodium battery, and a magnesium battery. For example, the battery is a lithium-ion battery, e.g. a LMFP-LTO battery.

According to another aspect, the present technology also relates to a method for trapping $CO_2$ generated in a battery or electrochemical cell, comprising contacting said CO2 with a polymer of Formula I as defined herein.

In one example, the method further comprises the step of applying a composition comprising the polymer on a surface of a battery or electrochemical cell component, wherein said composition further comprises a solvent and a catalyst.

In one example, the solvent is a solid solvent. For example, the solid solvent is selected for its ability to solubilize the catalyst for the $CO_2$ trapping reaction and for its low reactivity towards the epoxy functional groups. For instance, the solid solvent is a polar aprotic solid solvent, e.g. a polymer solvent such as PVP.

In one example, the catalyst acts as a catalyst in the $CO_2$ cycloaddition reaction. For example, the catalyst is an inorganic catalyst (e.g. lithium bromide (LiBr)) or an organic catalyst. For instance, the catalyst is an organic catalyst. Non-limiting examples of organic catalysts include quaternary ammonium salts, phosphonium salts, imidazolium salts or any other known organic base catalysts for $CO_2$ cycloaddition, preferably quaternary ammonium salts. In one example, the quaternary ammonium salt is a tetraalkylammonium halide (e.g. $Et_3BnNCI$).

In one aspect, the carbon dioxide is trapped by the generation of five-membered cyclic carbonates via cycloaddition of $CO_2$ on epoxides. According to one example, the chemical trapping of $CO_2$ occurs on the epoxide functional group of the polymer's monomeric units derived from the glycidyl acrylate of Formula II. For example, glycidyl methacrylate (GMA) is selected for its efficient conversion of epoxide groups to cyclic carbonate by fixation of $CO_2$. Indeed, GMA readily react with $CO_2$ in the presence of a catalyst with high rates of $CO_2$ insertion (>64%) and forms chemically compatible and moieties highly wettable by the electrolyte (e.g. a liquid electrolyte).

The chemical trapping of $CO_2$ by the epoxide functional group of the polymer's monomeric units derived from glycidyl methacrylate generates monomeric units derived from (2-oxo-1,3-dioxolane-4-yl)methyl methacrylate.

In one example, the polymer or the polymer composition as herein defined becomes insoluble in the electrolyte composition, e.g. in a liquid electrolyte, after the trapping of $CO_2$ by epoxides and formation of five-membered cyclic carbonates.

EXAMPLES

The following non-limiting examples are illustrative embodiments and should not be construed as further limiting the scope of the present invention. These examples will be better understood with reference to the accompanying Figures.

Example 1: Glycidyl-Containing Polymers Used as Binder Additive

This example illustrates the use of glycidyl-containing polymers as binder additives. In this example, PVdF was used as the polymer binder and glycidyl-containing polymer additives were developed in order to be compatible with PVdF and to be insoluble in the electrolyte. In this example, the monomeric units derived from Formula II was glycidyl methacrylate (GMA) for trapping $CO_2$ in the presence of a catalyst thereby forming moieties compatible with and highly wettable by the nonaqueous electrolyte. The second monomeric unit of Formula III was pentafluorostyrene because, selected in this case, for its compatibility with PVdF and its good electrochemical stability.

(a) Polymerization Under Radical Conditions of Glycidyl Methacrylate and Pentafluorostyrene

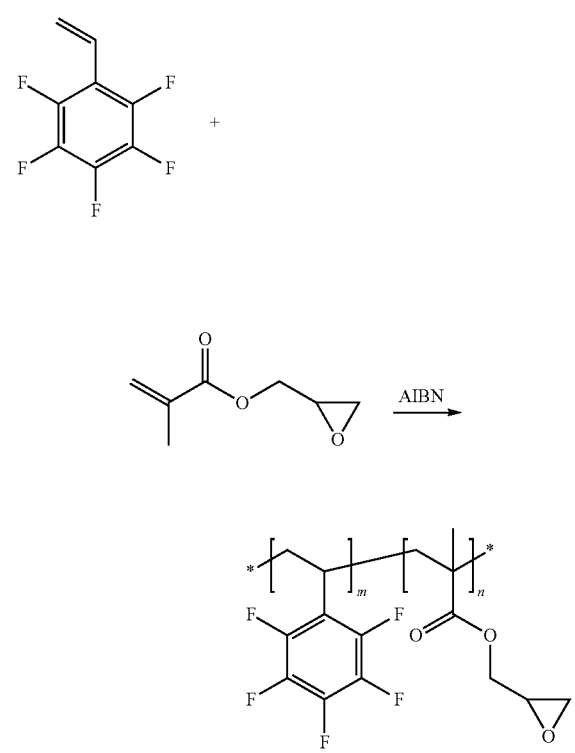

This example illustrates the azobisisobutyronitrile (AIBN)-initiated free-radical polymerization of glycidyl methacrylate (GMA) and pentafluorostyrene (PFS).

GMA and PFS were first passed through basic aluminum oxide (alumina, $Al_2O_3$). Polymerization was achieved by introducing 75 mL of dioxane, 2.2 g of GMA and 3.0 g of PFS into a 100 mL round-bottom flask. The solution was then stirred with a magnetic bar for 30 minutes and bubbled with nitrogen ($N_2$). 60 mg of AIBN was then added to the obtained solution. A condenser was then attached to the round-bottom flask and the reaction mixture was heated at 80° C. for 12 hours under $N_2$. The resulting solution was then cooled down to room temperature and poured in 10 volumes of diethyl ether. The supernatant was separated from the precipitated polymer, which was then dried under vacuum at 60° C. for 12 hours.

A standard production obtained using the procedure described in Example 1 (a) yield in a level of GMA incorporation of about 40 mol % or more.

(b) Electrochemical Properties of Cells Using a Glycidyl-Containing Polymer as Binder Additive The polymer as described in Example 1 (a) was used as electrode binder additive in $LiMn_{0.75}Fe_{0.20}Mg_{0.05}PO_4$-lithium titanate ($Li_4Ti_5O_{12}$, LTO) cells with a liquid electrolyte consisting of 1 M lithium hexafluorophosphate ($LiPF_6$) in a carbonate solvent mixture comprising propylene carbonate (PC), ethyl methyl carbonate (EMC) and dimethyl carbonate (DMC) (PC/EMC/DMC (4/3/3)).

TABLE 1

| | | Cell configurations | |
|---|---|---|---|
| Electrode | Material | Cell with binder additive (Cell 1) | Control cell without binder additive (Cell 2) |
| Positive electrode | Electrochemically active material | C-LiMn$_{0.75}$Fe$_{0.20}$Mg$_{0.05}$PO$_4$ (90 wt. %) | C-LiMn$_{0.75}$Fe$_{0.20}$Mg$_{0.05}$PO$_4$ (90 wt. %) |
| | Electronically conductive material 1 | Acetylene black (4 wt. %) | Acetylene black (4 wt. %) |
| | Electronically conductive material 2 | VGCF (1 wt. %) | VGCF (1 wt. %) |
| | Binder | PVdF (4 wt. %) | PVdF (5 wt. %) |
| | Binder additive | (1 wt. %) | |
| Negative electrode | Electrochemically active material | Li$_4$Ti$_5$O$_{12}$ (90 wt. %) | Li$_4$Ti$_5$O$_{12}$ (90 wt. %) |
| | Electronically conductive material | Acetylene black (5 wt. %) | Acetylene black (5 wt. %) |
| | Binder | PVdF (5 wt. %) | PVdF (5 wt. %) |

Prior to the electrochemical testing, the cells were submitted to three charge and discharge cycles at 0.2 C at 25° C. FIG. 1 shows that the initial capacity obtained with Cell 1 is about 2.47 mAh and is equivalent to the control cell (Cell 2).

Figure 2:
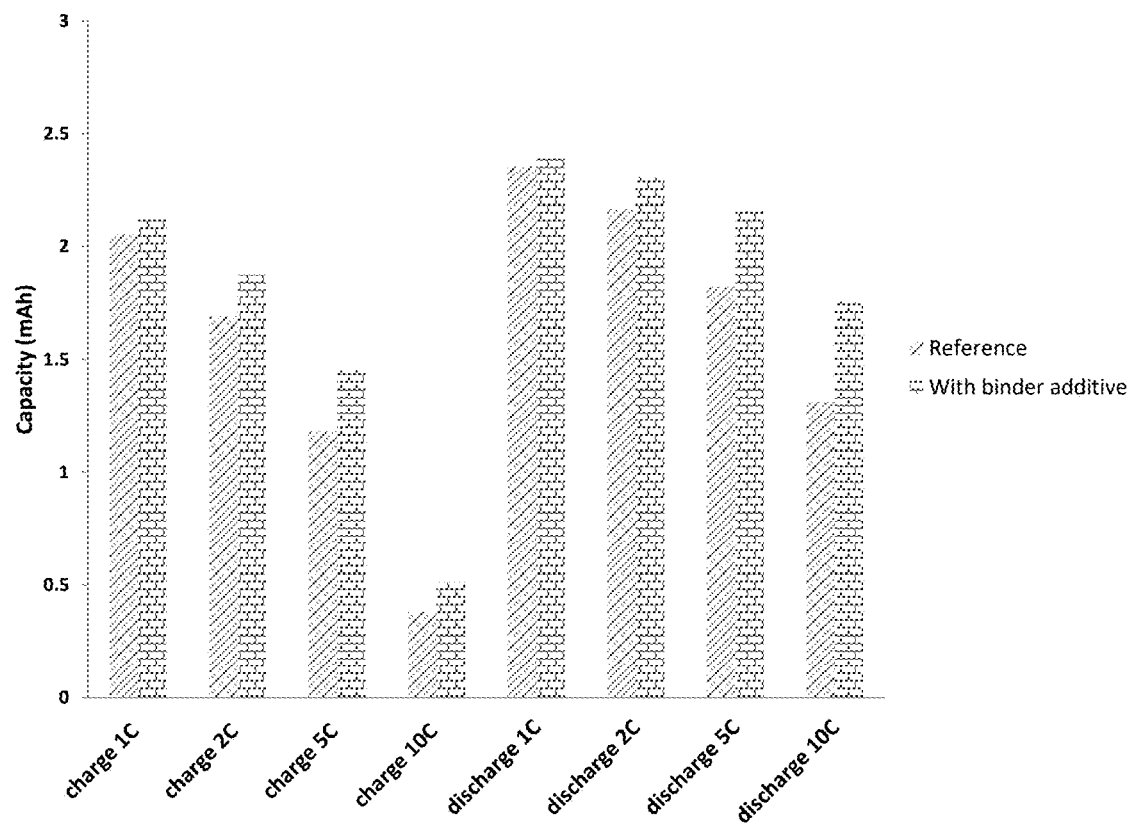
FIG. 2 shows the capacity results of Cell 1 (horizontal brick filling pattern) and Cell 2 (diagonal line filling pattern) as described in Example 1 (b) evaluated at different charge and discharge rates (1 C, 2C, 5C and 10C) and recorded at a temperature of 25° C.
Figure 3A:
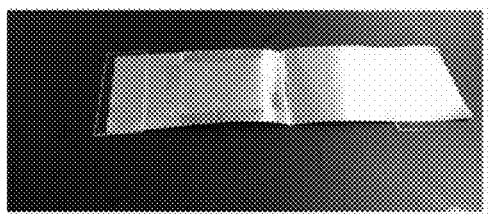
FIGS. 3A-3E display photographs of the process as described in Example 2 (e) showing in FIG. 3A the internal surface of a pouch-type cell case (i.e., the cell's shell), FIG. 3B the glycidyl-containing polymer composition coating solutions as described in Example 2 (d) being poured directly on the internal surface of a pouch shell, FIG. 3C the coating after being spread by the <Doctor blade >method and dried, FIG. 3D the sealed pouch shell pressurized with 5 to 15 mL of $CO_2$, and FIG. 3E the sealed pouch shells after being heating at a temperature of 25° C., 45° C. or 60° C. for 12, 24, 48 or 72 hours.
Figure 3B:
Figure 3C:
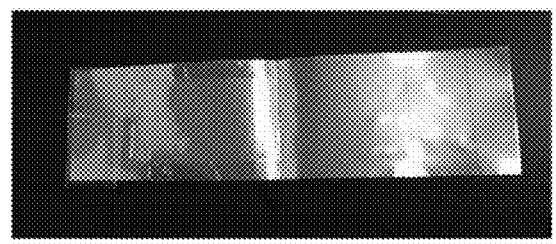
Figure 3D:
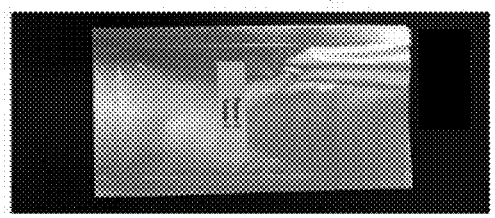
Figure 3E:
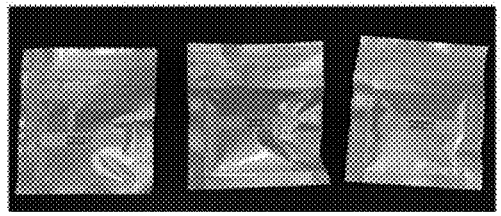

FIG. 2 displays the electrochemical performances evaluated at different charge and discharge rates (1C, 20, 5C and 10C) for both Cell 1 and the control cell (Cell 2). The capacity obtained with Cell 1 at 20, 5C and 10C were improved compared to the control cell (Cell 2).

Example 2: Glycidyl-Containing Polymers for Use in the Treatment of an Internal Surface of a Battery Component This example illustrates the use of glycidyl-containing polymers as coatings, for instance, on a surface of a battery component (e.g. the internal surface of a solid casing or flexible pouch). For example, the battery component is an aluminum foil, a plastic bag or a copper foil. In this example, copolymers are designed for enhancing the adhesion of the copolymer on the surface of a battery component and for improving CO$_2$ trapping. For example, the second monomeric unit of Formula III may be selected to increase adhesion.

(a) Polymerization of Glycidyl Methacrylate and Methyl Acrylate

This example illustrates the azobisisobutyronitrile (AIBN)-initiated free-radical polymerization of glycidyl methacrylate (GMA) and methyl acrylate (MA).

GMA and MA were passed through basic aluminum oxide (alumina, Al$_2$O$_3$) before use. 50 mL of tetrahydrofuran (THF), 5.79 g of GMA and 3.5 g of MA were introduced into a 100 mL round-bottom flask. The solution was then stirred with a magnetic bar at room temperature for 30 minutes and bubbled with nitrogen (N$_2$). 88 mg of AIBN was then added to the obtained solution. A condenser was then attached to the round-bottom flask and the reaction mixture was heated at 65° C. for 12 hours under N$_2$. The resulting solution was then cooled down to room temperature and poured in 10 volumes of diethyl ether for the polymer to precipitate. The supernatant was then removed, and the polymer was dried under vacuum at 60° C. for 12 hours.

A standard production yield obtained using the procedure described in Example 1 (b) was 6.9 g of copolymer, a % MA=43 mol % determined by proton nuclear magnetic resonance (1H NMR), a number average molecular weight (Mn)=28 900 g/mol and a polydispersity index (PDI)=1.9.

(b) Polymerization of Glycidyl Methacrylate and Butyl Acrylate

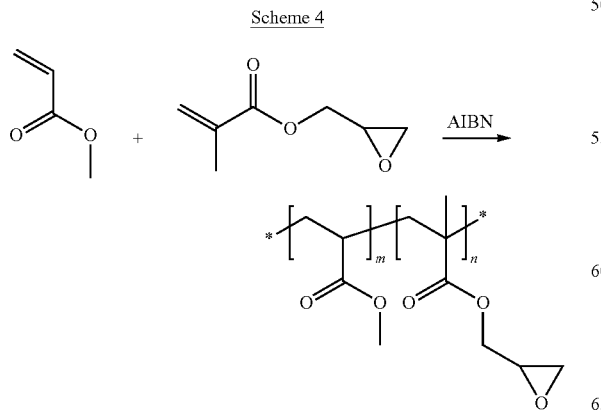

Scheme 4

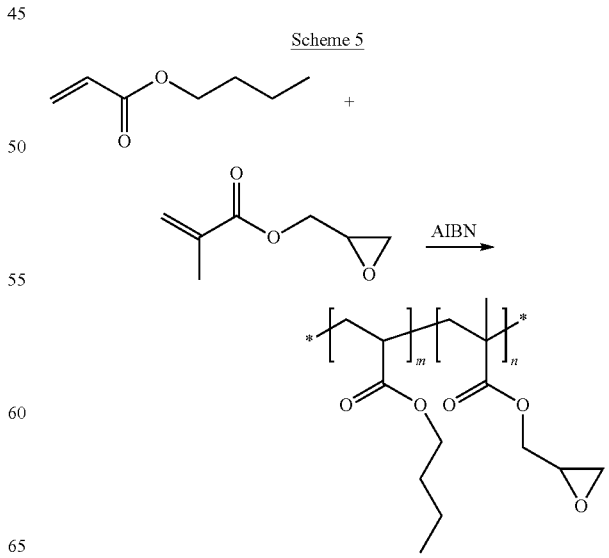

Scheme 5

GMA and butyl acrylate (BA) were passed through basic aluminum oxide (alumina, Al$_2$O$_3$) before use. 50 mL of THF, 5.79 g of GMA and 2.0 g. of BA were then introduced into a 100 mL round-bottom flask. The solution was then stirred with a magnetic bar at room temperature for 30 minutes and bubbled with nitrogen (N$_2$). 80 mg of AIBN was then added to the obtained solution. A condenser was attached to the round-bottom flask and the reaction mixture was heated at 65° C. for 12 hours under N$_2$. The resulting solution was cooled down to room temperature and poured into 10 volumes of diethyl ether for the to precipitate. The supernatant was then decanted, and the polymer was dried under vacuum at 60° C. for 12 hours.

A standard production yield obtained using the procedure described in Example 1 (c) was 5.8 g of copolymer, % BA=42 mol % determined by 1H NMR, Mn=30 900 g/mol and a PDI=1.8

(c) Polymerization of Glycidyl Methacrylate and 3-(Trimethoxysilyl) Propyl Acrylate Scheme 6

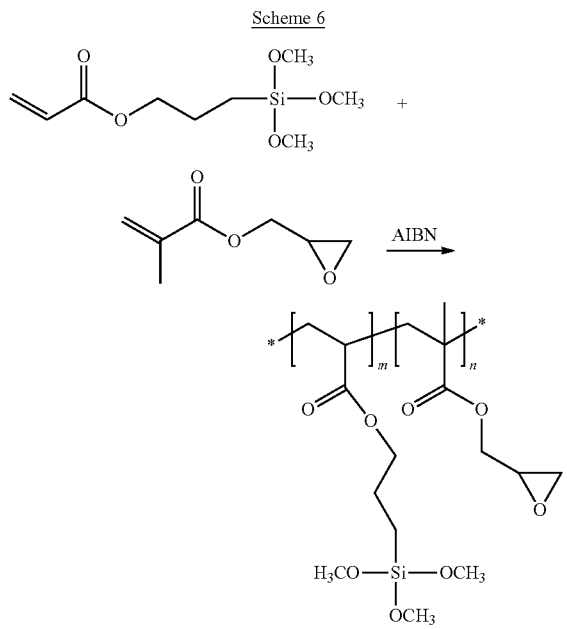

GMA and 3-(trimethoxysilyl) propyl acrylate were passed through basic aluminum oxide (alumina, Al$_2$O$_3$) before use. 40 mL of THF, 6.0 g of GMA and 3.0 g of 3-(trimethoxysilyl) propyl acrylate were introduced into a 100 mL round-bottom flask. The solution was then stirred with a magnetic bar at room temperature for 30 minutes and bubbled with nitrogen (N$_2$). 89 mg of AIBN was added to the obtained solution. The round-bottom flask was then equipped with a condenser and the reaction mixture was heated at 65° C. for 48 hours under N$_2$. The resulting solution was then cooled down to room temperature and poured in 10 volumes of diethyl ether for the polymer to precipitate. The supernatant was then separated, and the resulting polymer was dried under vacuum at 60° C. for 12 hours.

(d) Preparation of Glycidyl-Containing Polymer Composition Coating Solutions for Use in the Treatment of an Internal Surface of a Battery Component Polyvinylpyrrolidone (0.15 g, PVP 3500 g/mol from Acros) as a solid solvent and 50 mg of triethylbenzylammonium chloride as catalyst were mixed with 1 g of ethanol to obtain a first solution. A second solution was prepared by solubilizing 0.50 g of a polymer prepared in Example 2 (a), (b) or (c) in about 1.5 to 2.0 g of N-methyl-2-pyrrolidone (NMP). The resulting second solution was then stirred at a temperature of 80° C. The first solution was then added dropwise to the second solution and the resulting mixture was cooled down to room temperature.

(e) Treatment of an Internal Surface of a Battery Component and Preparation of Coated Pouch Cells The coated pouch shells were prepared as illustrated in FIG. 3. FIG. 3 (A) shows the internal side of a pouch shell. As seen on FIG. 3 (B) the coating solution as described in Example 2 (d) using the polymer prepared in Examples 2 (a), (b) or (c) was then poured directly on the internal side of a pouch shell, the coating solution was then spread by the ' Doctor blade >method and the coating was dried under vacuum at 80° C. for 3 to 12 hours. (see FIG. 3 (C)). The pouch cell shells were then sealed.

(f) Trapping of CO$_2$ by Epoxide Groups of the Polymers

The sealed pouch cell shells as described in Example 2 (e) were pressurized with 5 to 15 mL of CO$_2$ (see FIG. 3 (D)). Finally, the sealed pouch shells were heat treated in an oven at a temperature of 25° C., 45° C. or 60° C. for 12, 24, 48 or 72 hours.

(g) Fourier-Transform Infrared (FTIR) Spectroscopy Characterization

The conversion of epoxy functional groups from the sealed pouches treated as in Example 2 (f) into five-membered cyclic carbonate groups was characterized by FTIR. The conversion may be characterized by the disappearance of a signal at 900-905 cm-1 (epoxy groups) and the appearance of a C=O signal characteristic of cyclic carbonates at 1800-1805 cm-1. This technique allows an easy calculation of the conversation by the integration of the epoxide vs. cyclic carbonate signals.

Figure 4A:
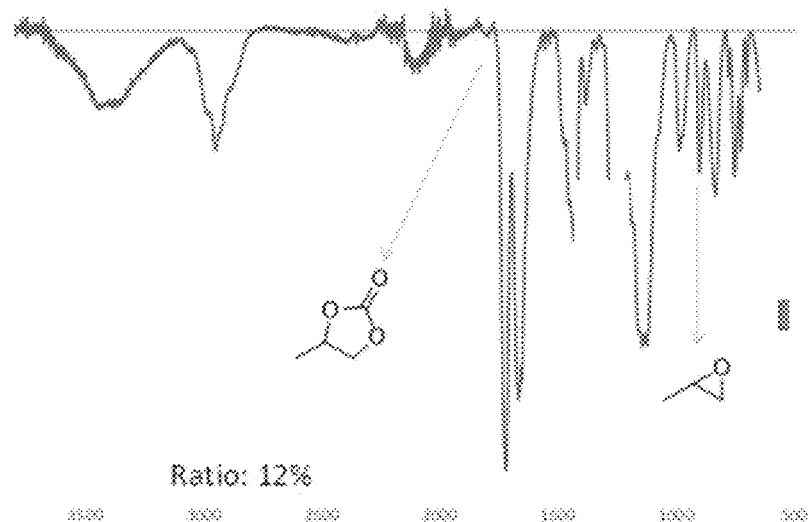
FIGS. 4A-4B display FTIR spectra with relevant peak assignment of a copolymer according to one embodiment, showing in FIG. 4A a poly(methyl acrylate-co-glycidyl methacrylate) coating and FIG. 4B the same coating after being heated for 12 hours at a temperature of 45° C. as described in Example 2 (g).
Figure 4B:
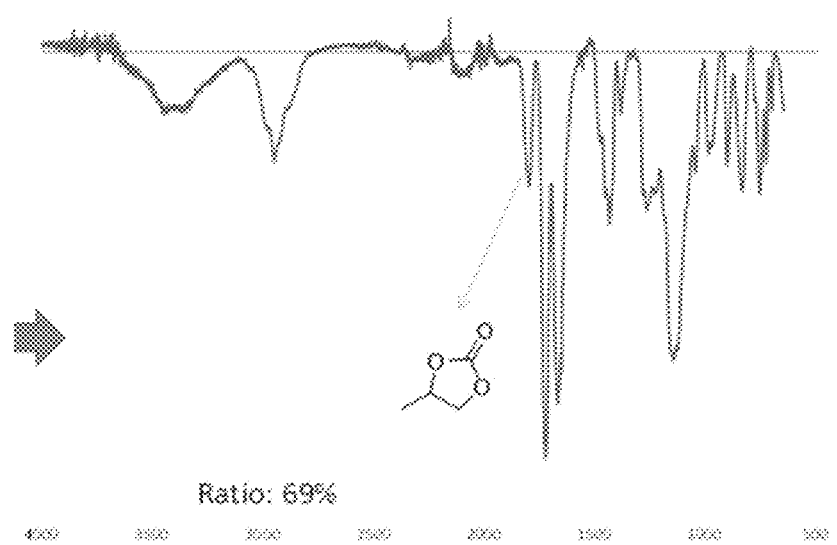

FIG. 4 displays FTIR spectra of (A) a poly(methyl acrylate-co-glycidyl methacrylate) coating (solvated in an ethanol and NMP mixture) with a thickness of 30 μm on an aluminum foil and (B) the same coating after being heated for 12 hours at a temperature of 45° C. The conversion of epoxy functional groups to five-membered cyclic carbonate groups was calculated by FTIR and was about 12% in (A) and about 69% in (B).

Tables 2 and 3 present the conversion results calculated after the above treatment using respectively poly(methyl acrylate-co-glycidyl methacrylate) and poly(butyl acrylate-co-glycidyl methacrylate) compositions in NMP after 72 hours at different temperatures.

TABLE 2

Poly(methyl acrylate-co-glycidyl methacrylate) in NMP (72 hours)

| Temperature (° C.) | Weight of CO$_2$ (mg) | Conversion calculated by FTIR |
|---|---|---|
| 25 | 41 | 84% |
| 45 | 60 | 98% |
| 60 | 68 | 100% |

TABLE 3

Poly(butyl acrylate-co-glycidyl methacrylate) in NMP (72 hours)

| Temperature (° C.) | Weight of $CO_2$ (mg) | Conversion calculated by FTIR |
|---|---|---|
| 25 | 6 | 69% |
| 45 | 11 | 88% |
| 60 | 13 | 99% | pouch cell shell with a fixed aluminum foil (5 cm×5.5 cm) coated with 61 mg of the copolymer coating prior to cycling. 2 Ah pouch-type lithium-ion cells with carbon coated $LiMn_{0.75}Fe_{0.20}Mg_{0.05}PO_4$ as a positive electrode and carbon coated $Li_4Ti_5O_{12}$ as a negative electrode were assembled in the pre-formed pouch cell shell with a liquid electrolyte (1 M $LiPF_6$ in PC/EMC/DMC (4/3/3)). An example of cell comprising a coating solution including a copolymer as defined herein (Cell 3) and a reference cell (Cell 4) for comparative purposes were prepared in the weight ratios detailed in Table 4.

TABLE 4

Cell configurations

| Electrode | Material | Cell with a copolymer coating on Al foil (Cell 3) | Control cell without (Cell 4) |
|---|---|---|---|
| Positive electrode | Electrochemically active material | C-$LiMn_{0.75}Fe_{0.20}Mg_{0.05}PO_4$ (90 wt. %) | C-$LiMn_{0.75}Fe_{0.20}Mg_{0.05}PO_4$ (90 wt. %) |
| | Electronically conductive material 1 | Acetylene black (4 wt. %) | Acetylene black (4 wt. %) |
| | Electronically conductive material 2 | VGCF (1 wt. %) | VGCF (1 wt. %) |
| | Binder | PVdF (5 wt. %) | PVdF (5 wt. %) |
| Negative electrode | Electrochemically active material | $Li_4Ti_5O_{12}$ (90 wt. %) | $Li_4Ti_5O_{12}$ (90 wt. %) |
| | Electronically conductive material | Acetylene black (5 wt. %) | Acetylene black (5 wt. %) |
| | Binder | PVdF (5 wt. %) | PVdF (5 wt. %) |

(h) Solid $^{13}C$ Nuclear Magnetic Resonance (NMR) Characterization

Figure 5:
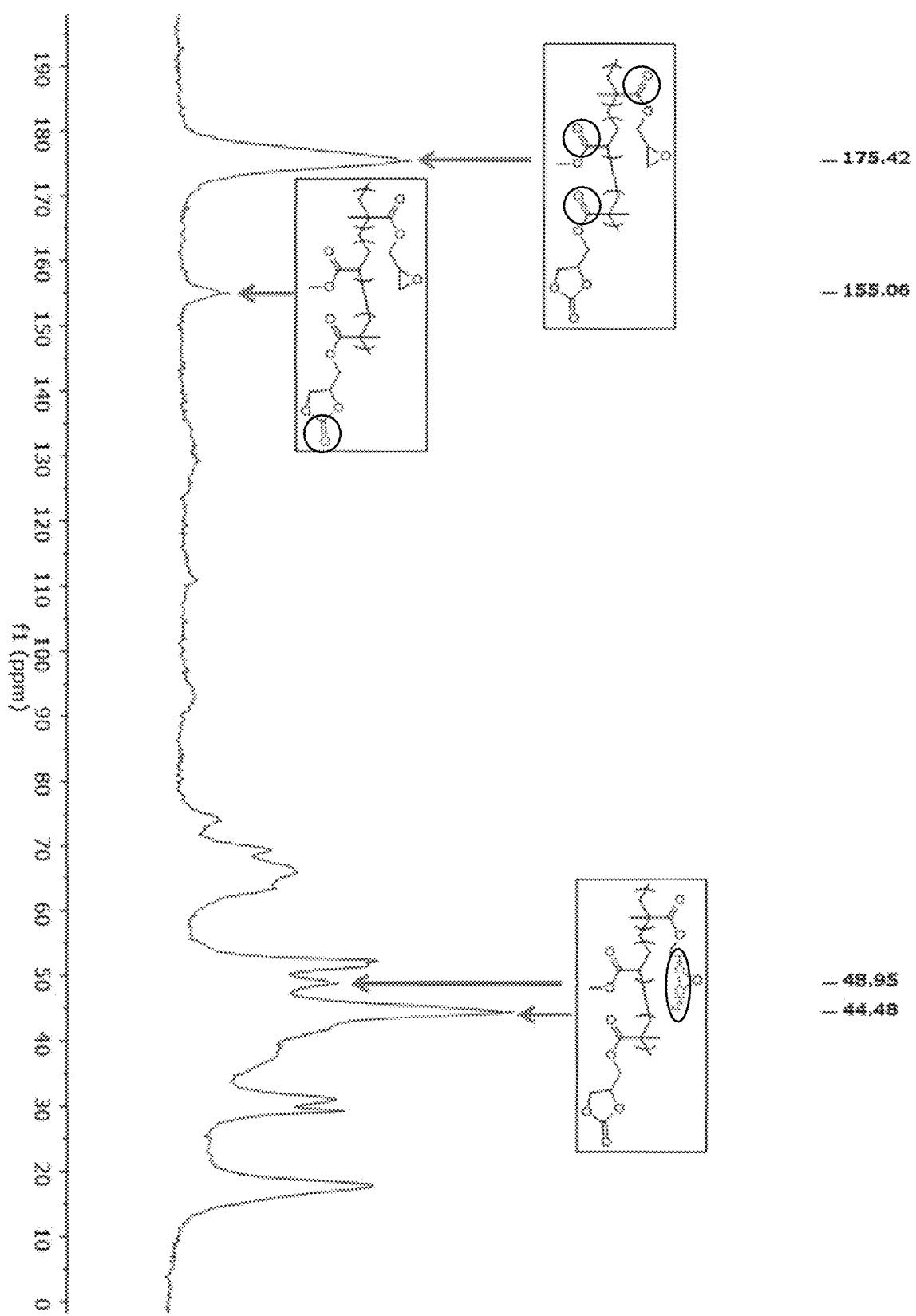
FIG. 5 displays a solid-state 13C nuclear magnetic resonance (NMR) spectrum with relevant peak assignment (circled) as described in Example 2 (h).

As shown in FIG. 5, solid-state 13C nuclear magnetic resonance (NMR) also demonstrated the conversion of epoxides and $CO_2$ into cyclic carbonates. Indeed, the $CO_2$ treated poly(methyl acrylate-co-glycidyl methacrylate) 13C NMR spectra presented in FIG. 5 shows a peak at 155.06 ppm characteristic of the carbonyl carbon atom present in five-membered cyclic carbonate groups. The broad signal at 175.42 ppm is associated with the carbon atom of the carbonyl group of ester moieties of both monomeric units. The signals at 48.95 and 44.48 ppm would correspond to the carbon atoms of remaining unreacted epoxides.

(i) Trapping of $CO_2$ Using a Copolymer of GMA and 3-(Trimethoxysilyl) Propyl Acrylate The process as described in Example 2 (e) was carried out with a coating composition comprising a copolymer of GMA and 3-(trimethoxysilyl) propyl acrylate as described in Example 2 (c). It was shown that an aluminum foil coated with a solution comprising a copolymer of GMA and 3-(trimethoxysilyl) propyl acrylate can trap about 11 mL of $CO_2$/g of copolymer after 24 hours at 45° C. Advantages of using this copolymer include that the resulting coating becomes insoluble in battery electrolyte solvents.

Figure 6:
FIG. 6 displays a photograph of a pouch shell comprising an aluminum foil coated with a copolymer as described in Example 2 (i).
Figure 7A:
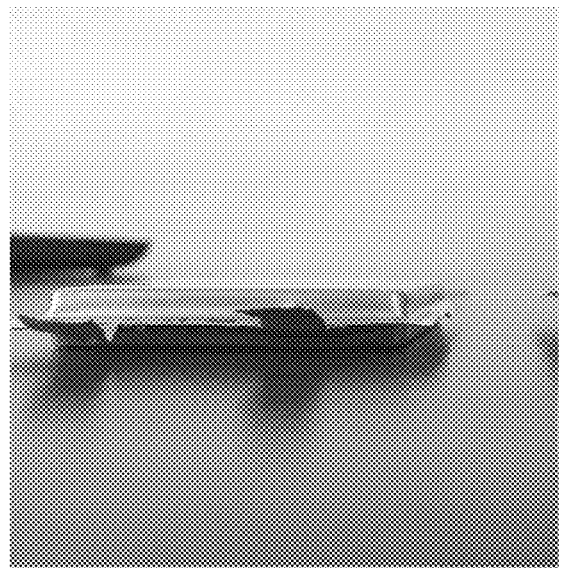
FIGS. 7A-7B display photographs of pouch cells after three charge and discharge cycles performed at 0.2 C showing in FIG. 7A Cell 3 a pouch cell with the two coated aluminum foils and in FIG. 7B Cell 4 a pouch cell without any coating as described in Example 2 (j).
Figure 7B:
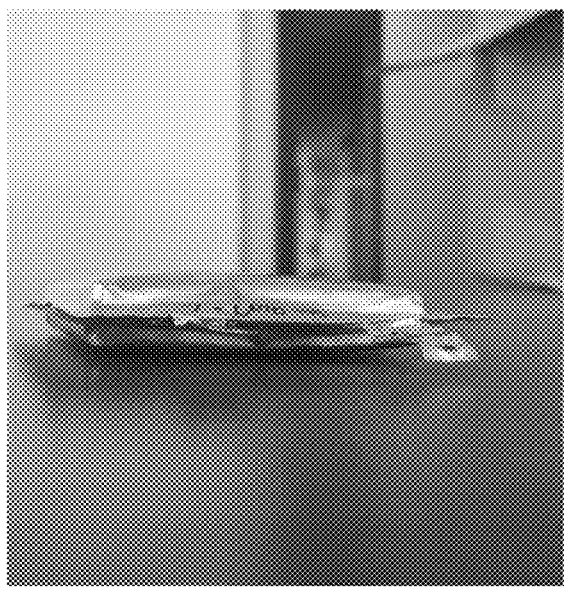

(j) Visual Inspection Characterization of the Cycle Aging of $LiMn_{0.75}Fe_{0.20}Mg_{0.05}PO_4$—$Li_4Ti_5O_{12}$ pouch cells Degradation studies were performed using the coating solution comprising a copolymer of GMA and 3-(trimethoxysilyl) propyl acrylate. The coating solution was coated as described in Example 2 (e) on two aluminum foils fixed on both the top and bottom internal surfaces of a preformed pouch cell shell. FIG. 6 shows a photograph of a pre-formed The pouch cells were then submitted to three charge and discharge cycles at 0.2 C (25° C.). FIG. 7 displays photographs of pouch cells after these three showing in (A) Cell 3 a pouch cell comprising the two coated aluminum foils and in (B) Cell 4 a control pouch cell without any coating. The visual inspection of the intact pouch cell (Cell 3) in (A) suggest that the $CO_2$ has been trapped by the copolymer coating and in (B) a clear swelling of the control cell (Cell 4) after cycling caused by $CO_2$ gas evolution is rather observed.

Numerous modifications could be made to any of the embodiments described above without distancing from the scope of the present invention. Any references, patents or scientific literature documents referred to in the present application are incorporated herein by reference in their entirety for all purposes.

The invention claimed is:

1. An electrochemical cell comprising an internal component coated with a polymer composition containing a solvent, a catalyst for a carbon dioxide cycloaddition reaction, and a polymer of Formula I:

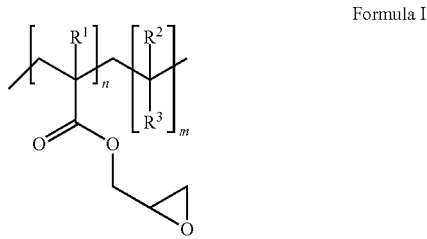

Formula I wherein:

$R^1$ and $R^2$ are each independently H or $CH_3$;

$R^3$ is selected from H, substituted or unsubstituted alkyl, substituted or unsubstituted aryl, substituted or unsubstituted $CO_2$alkyl; and n and m are integers, wherein n>0 and m is ≥0.

2. The electrochemical cell of claim 1, wherein $R^3$:
(i) is a substituted aryl; or
(ii) is selected from H or a substituted or unsubstituted alkyl; or
(iii) is a substituted or unsubstituted $CO_2$alkyl.

3. The electrochemical cell of claim 1, wherein the solvent is a solid solvent.

4. The electrochemical cell of claim 1, wherein the catalyst for the carbon dioxide cycloaddition reaction is an inorganic catalyst or an organic catalyst.

5. The electrochemical cell of claim 1, wherein the electrochemical cell component is an electrochemical cell shell and the polymer composition forms a coating on an internal surface of the electrochemical cell shell.

6. A method for trapping $CO_2$ generated in an electrochemical cell as defined in claim 1, the method comprising contacting said $CO_2$ with the polymer of Formula I.

7. The method of claim 6, further comprising the step of applying the polymer composition on a surface of an electrochemical cell component of the electrochemical cell.

8. The method of claim 7, wherein the electrochemical cell component is selected from a current collector, a thin film inert insertion, and an internal surface of an electrochemical cell shell.

9. The electrochemical cell of claim 1, wherein the polymer composition forms a coating on an internal surface of the electrochemical cell component.

10. The electrochemical cell of claim 1, wherein the electrochemical cell component is a current collector, a thin film inert insertion, or an internal surface of an electrochemical cell shell.

11. A battery comprising an electrochemical cell as defined in claim 1.

12. The electrochemical cell of claim 4, wherein the inorganic catalyst is lithium bromide.

13. The electrochemical cell of claim 4, wherein the organic catalyst is selected from the group consisting of quaternary ammonium salts, phosphonium salts, imidazolium salts, and any other known organic base catalysts for $CO_2$ cycloaddition.

14. The battery of claim 11, wherein said battery is selected from a lithium battery, a lithium-air battery, a lithium-sulfur battery, a lithium-ion battery, a sodium battery, and a magnesium battery.

* * * * *